DEFENSIVE PUBLICATION

UNITED STATES PATENT AND TRADEMARK OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent and Trademark Office makes no assertion as to the novelty of the disclosed subject matter.

PUBLISHED SEPTEMBER 7, 1976

950 O.G. 5

T950,001
BAG FILTERING METHOD FOR HYGROSCOPIC PARTICULATES

Edwin D. Myers, Sheffield, Ala., assignor to Tennessee Valley Authority

Filed Dec. 19, 1974, Ser. No. 534,193
Int. Cl.[2] B01D *46/04*
U.S. Cl. 55—96
1 Sheet Drawing. 10 Pages Specification

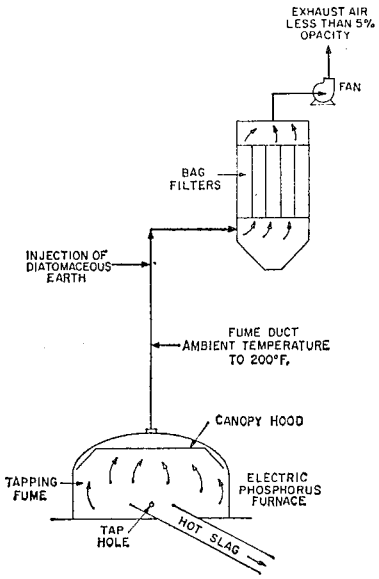

BAG FILTER FLOW DIAGRAM FOR REMOVING HYGROSCOPIC SUBMICRON FUME

A process for the recovery of hygroscopic submicron particulates from high opacity stack gas using bag filters precoated with diatomaceous earth to absorb the hygroscopic particulates. Hygroscopic fume such as $P_2O_5$ laden fume resulting from the slag tapping operation of electric phosphorus furnaces is collected in a hood and piped to a bag filter house. The precoat is applied by continuous or intermittent injection of relatively small amounts of the diatomaceous earth into the airstream prior to its entry into the bag filters. When the pressure drop across the filters has increased to a predetermined amount, the filter cake is removed dry from the surface of the bags by shaking or by a reverse jet of air. The precoating of the filter bags with diatomaceous earth substantially eliminates the problem of biinding and increases collection efficiency.

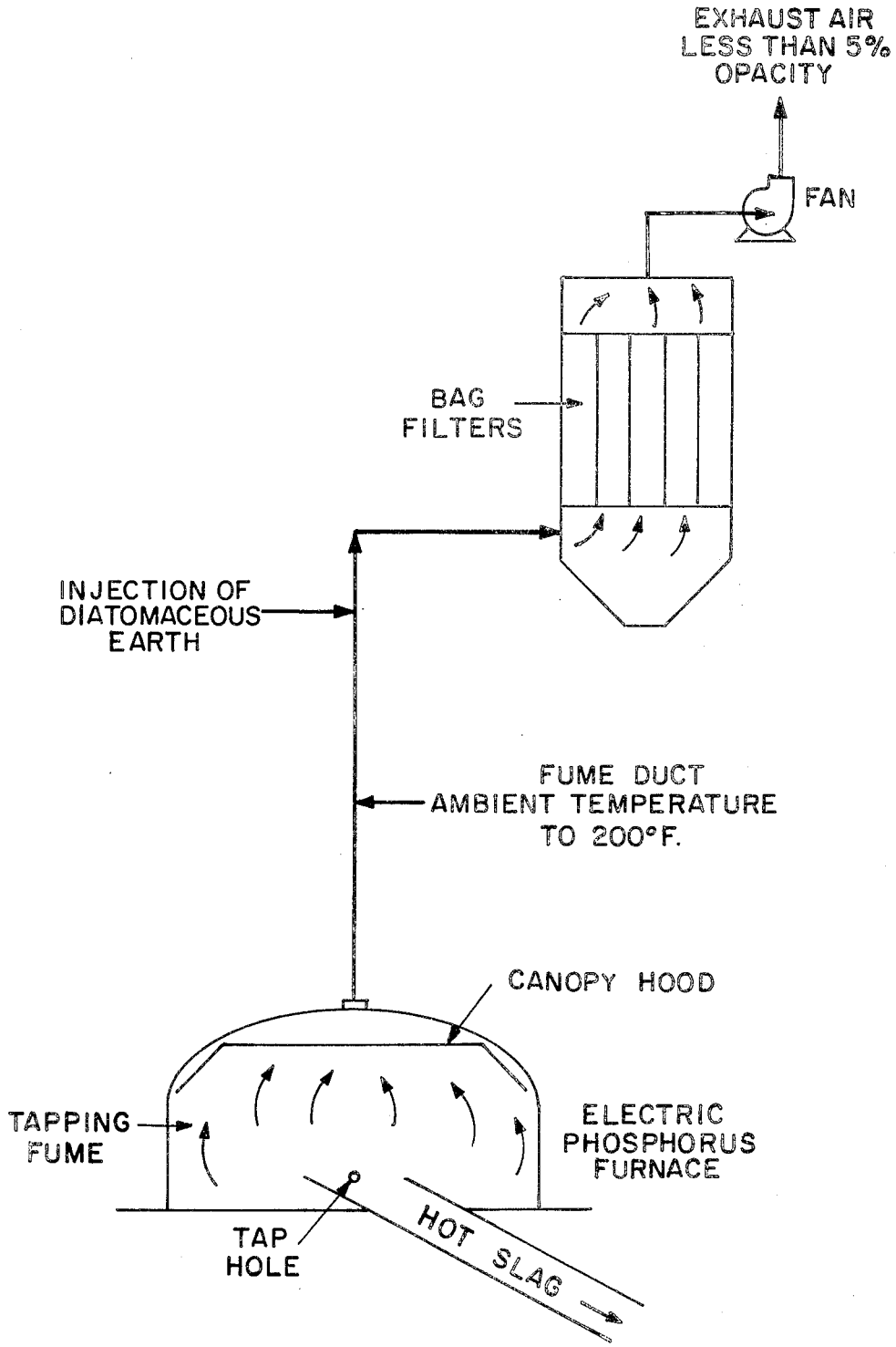
BAG FILTER FLOW DIAGRAM FOR
REMOVING HYGROSCOPIC SUBMICRON FUME